Aug. 13, 1946.　　　M. D. BUIVID　　　2,405,777
FOLDABLE ROTOR
Filed March 31, 1943　　　2 Sheets-Sheet 1

INVENTOR
Michel D. Buivid
BY
Harris G. Luther
ATTORNEY

Aug. 13, 1946.   M. D. BUIVID   2,405,777
FOLDABLE ROTOR
Filed March 31, 1943    2 Sheets-Sheet 2
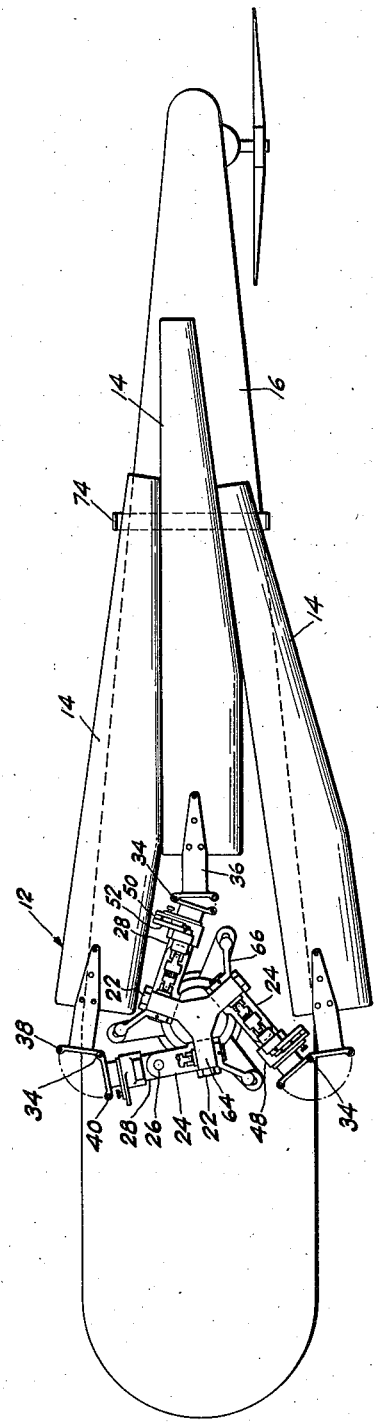
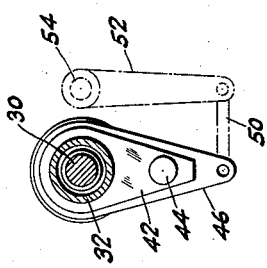
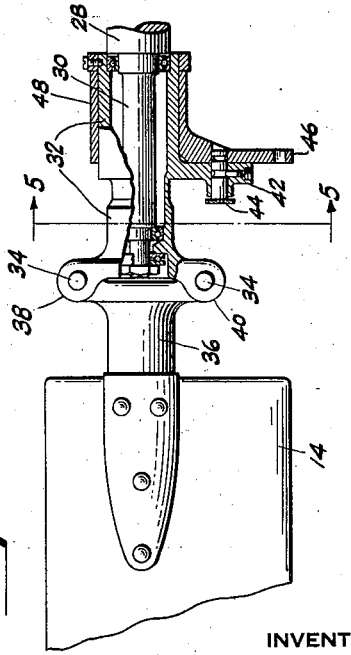
INVENTOR
*Michel D. Buivid*
BY
*Harris G. Luther*
ATTORNEY Patented Aug. 13, 1946

2,405,777

UNITED STATES PATENT OFFICE 2,405,777

FOLDABLE ROTOR

Michel D. Buivid, Milford, Conn., assignor to United Aircraft Corporation, East Hartford, Conn., a corporation of Delaware Application March 31, 1943, Serial No. 481,254

4 Claims. (Cl. 170—164)

Folding of the blades of a rotor of a rotary wing aircraft such as a helicopter so that all the blades may lie over the fuselage is advantageous, for example, in storing or parking the vehicle. The control structure and especially the pitch changing structure, however, may be subjected to abnormal strains during the process of folding the blades unless extreme care is exercised because of the large moments exerted by the blade when it is folded to a position at right angles to its normal position.

If the blade folding hinge is between the blade and its pitch changing pivot the blade pitch may be such that, when the blade is folded, the tip of the blade will not be on the same level as the tips of the other blades due to the angle of the folding hinge; and all the blades may not be supported on a single bracket without straining the blade structure or the pitch control structure.

An object of this invention is to provide structure permitting folding the blades without subjecting the control structure to strains.

Another object is to disengage the pitch control structure from the blade when folding the rotor.

Other objects and advantages will be apparent from the specification and claims, and from the accompanying drawings which illustrate what is now considered to be the preferred embodiment of the invention.

Fig. 2 is a plan view of the helicopter with the blades folded.

Fig. 4 is a fragmentary plan view on an even larger scale of a portion of the pitch changing mechanism and the mechanism permitting the folding of the blade.

Fig. 5 is a sectional view substantially along the line 5—5 of Fig. 4.

Figure 1:
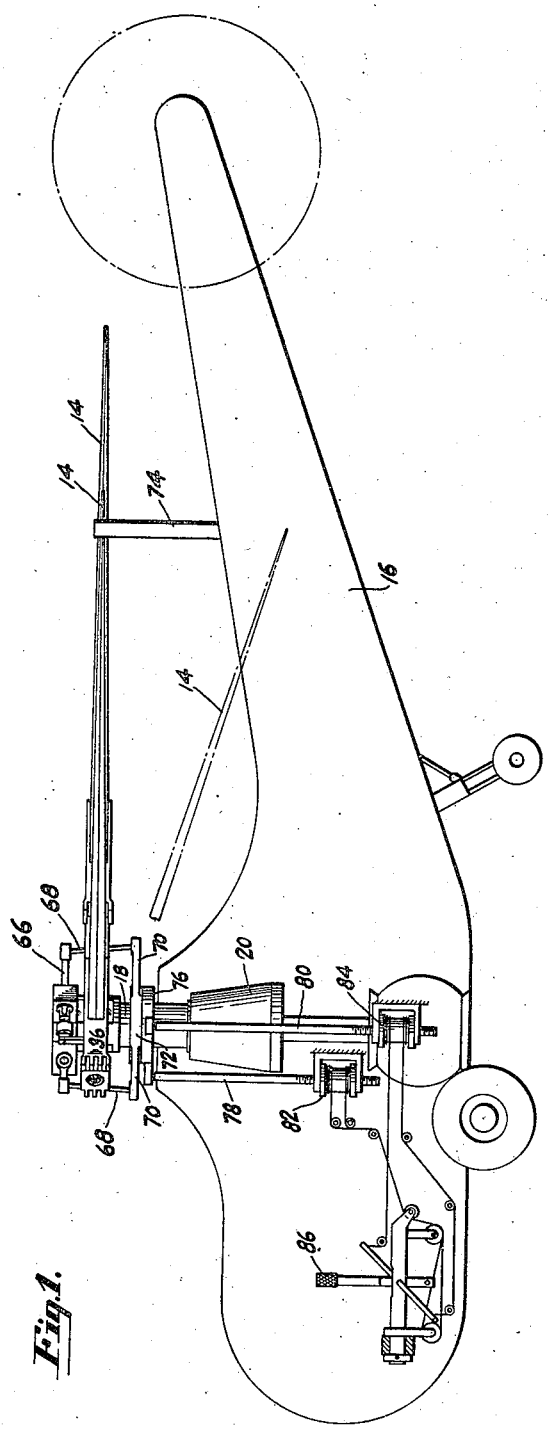
Fig. 1 is a side elevation of a helicopter with the blades folded back and one of the blades partly folded back partially shown in dot and dash lines.

The rotary wing aircraft illustrated as a helicopter has a power-driven sustaining rotor, generally indicated at 12, having several individual blades 14 (Fig. 2). Blades 14 are carried by the upper end of a shaft 18 journaled in a head 20 in the fuselage 16. This shaft has horizontal pins 22 each supporting a link 24. The outer end of each link 24 has a vertical pin 26 pivotally supporting a connector 28. A pin 30 extending from connector 28 fits upon thrust and guide bearings 31 within a rotatable sleeve or bracket 32 connected by pins 34 to a mounting bracket 36 on the inner end of blade 14. Means, not shown for purposes of clearness of illustration, such as supporting wires or stops may be used to limit the extent of movement of the blade about pin 22 and means such as shock absorbers may be used to limit the extent of movement of the blade about the drag hinge pin 26.

Brackets 32 and 36 are connected by a hinge joint comprising interengaging hinge lugs 38 and 40 which receive the pins 34. Thus, upon removal of either pin 34, the blade is free to hinge about the axis of the other pin for movement either in the direction of blade rotation or in the opposite direction. With each blade similarly mounted, it is possible to fold the blades into the position of Fig. 2 from whatever position they come to rest.

The pitch of the blades is progressively changed by movement about the pin 30 during each rotation of the blades to control the attitude of the aircraft and the direction and rate of flight. To this end, bracket 32 has a projecting arm 42 connected by a removable pin 44 to an arm 46. Arm 46 has a hub 48 mounted to turn on bracket 32 and is connected by a link 50 to an arm 52 (Fig. 5). Arm 52 is mounted on the end of shaft 54, Fig. 3, which is journaled in bearing 56 on connector 28. Shaft 54 is connected by universal joints 58 and 60 and spline 61 to a short shaft 62 turnable in a bearing 64 on the end of rotor shaft 18. Shaft 62 has a projecting arm 66 connected by a link 68 to an arm 70 extending from a control plate 72, Fig. 1. This plate is part of the azimuth plate, the angularity of which, with respect to shaft 18, controls the extent of the pitch adjustment of the individual blades and the point in each revolution at which the pitch change begins.

The upper plate 72 of the azimuth plate is supported on gimbals upon the drive shaft and rotates with the rotor and the lower plate 76 is restrained against rotation. Pitch adjusting rods 78 and 80 are movable vertically by, and connect plate 76 with, adjusting nuts 82 and 84 which are controlled by movements of control stick 86; cables being illustrated as one means of connecting the stick with the nuts. As this mechanism is irreversible it will be apparent that strains placed upon the pitch adjusting mechanism by a blade allowed to droop to a position such as indicated by the dot and dash lines in Fig. 1 could be of great magnitude. A pitch changing mechanism strong enough to support a blade without allowing it to droop would have to be of excessive weight and strength.

Means, not shown for purpose of clearness of illustration, for simultaneously changing the pitch of all the blades, such as means for vertically moving the shaft bearing 64, may be provided, and other types of pitch adjusting mechanism may, of course, be used, such for instance as the type shown and described in United States application Serial Nos. 470,336 and 477,416. Even where reversible pitch changing mechanism is used, the vertical movements of the blade tips during the folding operation may exceed the limits of travel of the pitch changing mechanism, and thus strain the pitch changing mechanism.

When any one of the blades is to be folded, one of the pins 34 is removed and the blade is then swung about the axis of the other pin into the position of Fig. 2 where the end of the blade is supported by a bracket 74. As indicated above, during the folding of the blade, failure to support the end of the blade may put an undesirable strain on the pitch controlling structure. To avoid this, pin 44 is withdrawn disconnecting the blade and the hinge joint from the pitch control mechanism so that bracket 32 and blade 14 are free to turn with respect to arm 46. Thus, even if a blade is allowed to reach the slanting position of blade 14, Fig. 1, no strain is put on the pitch control structure since the bracket 32 turns within hub 48.

The same arrangement of parts permits folding of the blade when the rotor comes to rest with any one of the blades set at a high pitch. By disengaging pin 44, the outer end of the blade is free to be moved vertically when the blade reaches the folding position, and no strain is placed on the control structure by resting the end of the blade on bracket 74. This bracket may be removable to avoid interference with the blades in flight.

Figure 3:
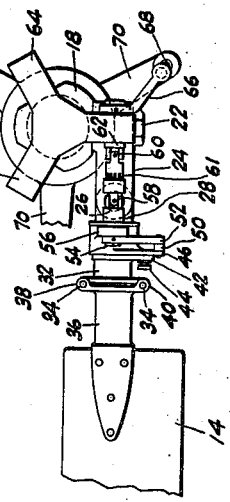
Fig. 3 is a plan view on a larger scale showing the pitch changing mechanism of one of the rotor blades.

The blade pitch control mechanism, shown in plan in Fig. 3, forms the subject matter of a divisional application hereof, U. S. Appl. Ser. No. 647,031.

It is to be understood that the invention is not limited to the specific embodiment herein illustrated and described, but may be used in other ways without departure from its spirit as defined by the following claims.

I claim:

1. In combination with a rotor blade, a drag hinge fixed against rotation about an axis normal to the axis of said hinge, a pivotal mounting for supporting said blade for pitch changing movements, a pitch changing means having a limited movement, means positively connecting said blade to said pitch changing means, means for disabling said connecting means, and folding hinge means between said pivotal mounting and said blade for folding said blade relative to said mounting, and means for locking said folding hinge means.

2. A device as described in claim 1 in which the axis of said folding hinge means is substantially perpendicular to the plane of the chords of said blade.

3. In combination with a rotor blade, a drag hinge fixed against rotation about an axis normal to the axis of said hinge, and guiding said blade in its fore and aft flight-induced movement, a pivotal mounting for supporting said blade for pitch changing movement, pitch changing means having a limited movement, means connecting said blade to said pitch changing means, folding hinge means connecting said pivotal mounting with said blade, and means for preventing relative movement of said folding hinge means during operation of said blade and for releasing said folding hinge means for folding said blade when the blade is at rest, and means for disabling the means connecting said blade to said pitch changing means to render said blade free to rotate about the axis of the pivotal mounting.

4. A device as set forth in claim 1 in which the means for disabling the pitch changing means includes a part secured to the connecting means, a part secured to the pivotal mounting, and a latch between said parts.

MICHEL D. BUIVID.